H. W. FALCONER.
IDENTIFYING MEANS FOR AUTOMOBILES.
APPLICATION FILED MAR. 3, 1919.

1,333,478.

Patented Mar. 9, 1920.

INVENTOR
Harry W. Falconer,
By Burn, Burn & Crampton,
His attys.

UNITED STATES PATENT OFFICE.

HARRY W. FALCONER, OF WOOD COUNTY, OHIO.

IDENTIFYING MEANS FOR AUTOMOBILES.

1,333,478.  Specification of Letters Patent.  Patented Mar. 9, 1920.

Application filed March 3, 1919. Serial No. 280,203.

*To all whom it may concern:*

Be it known that I, HARRY W. FALCONER, a citizen of the United States, and a resident of the county of Wood and State of Ohio, near Perrysburg, Ohio, have invented a certain new and useful Identifying Means for Automobiles; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates particularly to identifying means for automobiles, and has for its primary object to provide an automobile, or parts thereof, with identifying means which is extremely difficult if not impossible to obliterate or remove without detection, thereby tending to prevent or deter the stealing of automobiles so marked.

The invention is fully described in the following specification, and while, in its broader aspect, it is capable of embodiment in numerous forms, a preferred embodiment thereof is illustrated in the accompanying drawings, in which—

Figure 1:
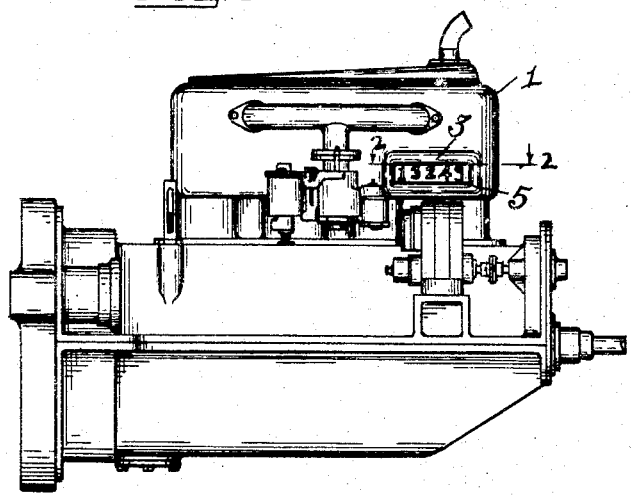
Figure 2:
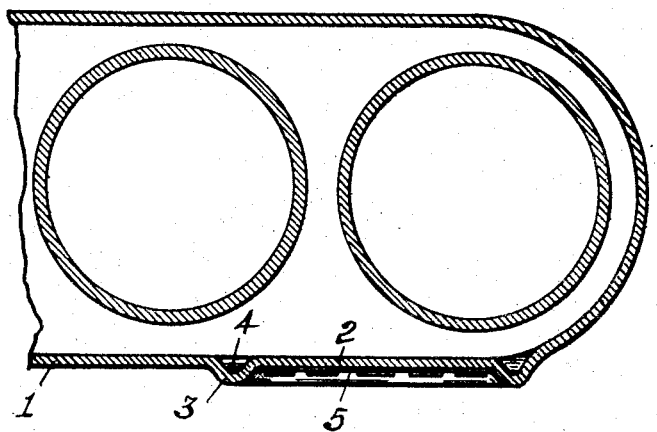
Figure 3:
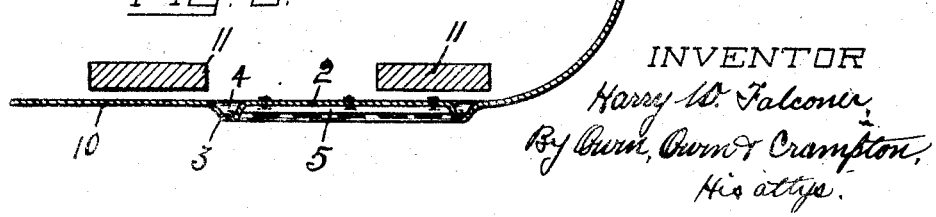

Figure 1 is a side elevation of an automobile engine embodying the invention. Fig. 2 is an enlarged section on the line 2—2 thereof, and Fig. 3 is a fragmentary part of the rear portion of an automobile body provided in the casing with the invention.

Referring to the drawings, 1 designates an automobile engine, a portion of the casing of which, in the present instance its water jacket is formed with a panel 2, for receiving an identifying mark, which panel is bounded by an outwardly projecting wall 3, in the present instance, in the form of a bead. If the wall is of protuberant form with the bottom of the panel 2 substantially flush or on a plane with the casing wall, as shown, the inner side of the bead should be hollow or concave to provide the surrounding recess 4, with its depth greater than the thickness of the panel 2. It is thus evident that the bead or wall around the panel can not be ground or cut off for the purpose of obliteration to destroy the panel effect without severing or separating the panel from the casing of which it forms a part. If the panel is severed and removed from the casing, a conspicuous hole is left therein, which, if in the engine water jacket, would render the engine inoperative.

An identifying mark or number, preferably the latter, is provided on the outer side of the panel, and such mark or number is preferably formed on a plate or block 5 having a glazed surface to render the number conspicuous and attractive. The plate or block 5 may be riveted, bolted, welded or secured to the panel back in any suitable manner. The background for the mark or number or the mark itself may be of any desired color, certain colors, if desired, being used for certain predetermined districts or sections of the country to facilitate locating a stolen automobile. For instance, if an automobile sold for use in Ohio has the identifying number or the background thereof blue, the car, if stolen, can be more readily located and identified in another State or Territory where the color of the identifying number or its background of automibiles sold for use therein is different.

It is evident that should the identifying mark or number be removed from the car, its absence from the panel would tend to arouse suspicion, and the bead or wall forming the panel could not be removed or obliterated without severing the panel from the casing, thereby rendering it extremely difficult to remove or obliterate the number and panel without arousing suspicion.

The same idea as above described is illustrated in Fig. 3, except that it is embodied in the casing of an automobile body, 10 designating a part of the body casing, and 11 parts of the reinforcing frame.

I wish it understood that my invention is not limited to any specific construction, arrangement or form of the parts, or to the location thereof in any particular part of an automobile, but that it is capable of numerous changes and modifications without departing from the spirit of the claims.

Having thus described my invention, what I claim as new and desire to secure by Letters Patent, is—

1. The casing of a portion of an automobile, having a panel for an identifying designation provided therein, the surrounding wall which forms the panel causing a spacing of the edges of the panel and casing whereby cutting the wall away effects a severing of the panel from the casing.

2. The casing for a portion of an automobile having a panel formed therein substantially in the plane of the casing and separated from the casing by an outwardly protuberant bead which is hollow at its inner side to a depth which is greater than the thickness of the panel.

In testimony whereof, I have hereunto signed my name to this specification.

HARRY W. FALCONER.